(12) United States Patent
Hoffmann et al.

(10) Patent No.: US 10,187,404 B2
(45) Date of Patent: Jan. 22, 2019

(54) SYSTEM AND METHOD FOR DETECTING ATTACKS ON MOBILE AD HOC NETWORKS BASED ON NETWORK FLUX

(71) Applicant: HRL Laboratories, LLC, Malibu, CA (US)

(72) Inventors: Heiko Hoffmann, Simi Valley, CA (US); Gavin D. Holland, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 125 days.

(21) Appl. No.: 15/073,158

(22) Filed: Mar. 17, 2016

(65) Prior Publication Data

US 2017/0318032 A1   Nov. 2, 2017

Related U.S. Application Data

(60) Provisional application No. 62/135,151, filed on Mar. 18, 2015.

(51) Int. Cl.
*H04L 29/06* (2006.01)
*H04L 12/22* (2006.01)
*H04W 12/12* (2009.01)
*H04W 84/18* (2009.01)

(52) U.S. Cl.
CPC .......... *H04L 63/1416* (2013.01); *H04L 12/22* (2013.01); *H04L 29/06* (2013.01); *H04L 63/1408* (2013.01); *H04L 63/1433* (2013.01); *H04L 63/1441* (2013.01); *H04L 63/162* (2013.01); *H04W 12/12* (2013.01); *H04L 63/1425* (2013.01); *H04L 63/1458* (2013.01); *H04L 2463/143* (2013.01); *H04W 84/18* (2013.01)

(58) Field of Classification Search
CPC ............. H04L 63/1416; H04L 63/1433; H04L 63/1441
See application file for complete search history.

(56) References Cited

U.S. PATENT DOCUMENTS

| | | | |
|---|---|---|---|
| 7,610,624 B1* | 10/2009 | Brothers | ............... H04L 63/145 709/223 |
| 2004/0215976 A1 | 10/2004 | Jain | |
| 2006/0293123 A1* | 12/2006 | Sullivan | ............. A63B 37/0003 473/371 |

(Continued)

OTHER PUBLICATIONS

International Search Report of the International Searching Authority for PCT/US2016/022974; dated Jul. 1, 2016.

(Continued)

*Primary Examiner* — Yonas A Bayou
(74) *Attorney, Agent, or Firm* — Tope-McKay & Associates

(57) ABSTRACT

Described is a system for detecting attacks on mobile networks. The system includes the relevant hardware and components to perform a variety of operations including continuously measuring time-varying signals at each node in a network. The system determines network flux on the time-varying signals of all nodes in the network and detects a network attack if the network flux exceeds a predetermined threshold. Further, a reactive protocol is initiated if the network flux exceeds the predetermined threshold.

16 Claims, 7 Drawing Sheets

(56) References Cited

U.S. PATENT DOCUMENTS

| | | | |
|---|---|---|---|
| 2007/0153689 A1 | 7/2007 | Strub et al. | |
| 2008/0005360 A1* | 1/2008 | Belgaied | H04L 63/1408 709/251 |
| 2008/0028467 A1* | 1/2008 | Kommareddy | H04L 63/1458 726/23 |
| 2009/0007266 A1* | 1/2009 | Wu | H04L 63/1425 726/22 |
| 2009/0077413 A1* | 3/2009 | Dake | H04L 63/1408 714/4.1 |
| 2010/0026494 A1* | 2/2010 | Lees | G06K 7/0008 340/572.1 |
| 2012/0174220 A1 | 7/2012 | Rodriguez | |
| 2012/0216282 A1* | 8/2012 | Pappu | H04L 63/1416 726/23 |
| 2013/0104230 A1* | 4/2013 | Tang | G06F 21/552 726/23 |
| 2014/0181966 A1* | 6/2014 | Carney | H04L 63/1491 726/22 |
| 2014/0373146 A1* | 12/2014 | Murthy | H04L 63/1408 726/23 |
| 2014/0380467 A1* | 12/2014 | Winquist | H04L 63/1408 726/22 |
| 2015/0007314 A1* | 1/2015 | Vaughan | H04L 63/1441 726/23 |

OTHER PUBLICATIONS

The Written Opinion of the International Searching Authority for PCT/US2016/022974; dated Jul. 1, 2016.

Notification of Transmittal of International Search Report and the Written Opinion of the International Searching Authority for PCT/US2016/022974; dated Jul. 1, 2016.

International Preliminary Report on Patentability for PCT/US2016/022974; dated Mar. 10, 2017.

M. Argollo de Menezes and A. L. Barabasi. Separating Internal and External Dynamics of Complex Systems, Physical Review Letters vol. 93, No. 6, 2004, pp. 068701-1-068701-4.

M. Kurant and P. Thiran. Layered complex networks, Physical Review Letters, vol. 96, No. 13, pp. 138701-1-138701-4, (2006).

Corrected International Preliminary Report on Patentability for PCT/US2016/022974; dated May 3, 2018.

* cited by examiner

SYSTEM AND METHOD FOR DETECTING ATTACKS ON MOBILE AD HOC NETWORKS BASED ON NETWORK FLUX

GOVERNMENT RIGHTS

This invention was made with government support under U.S. Government Contract Number AFRL-FA875014-C-0017. The government has certain rights in the invention.

CROSS-REFERENCE TO RELATED APPLICATIONS

This is a non-provisional patent application of U.S. Provisional Application No. 62/135,151, filed on Mar. 16, 2015, the entirety of which is hereby incorporated by reference.

BACKGROUND OF INVENTION

(1) Field of Invention

The present invention is related to a system for detecting attacks on mobile ad hoc networks (MANETs) and, more specifically, to a system for detecting attacks by identifying dynamic structure dependency changes in the network that signal suspicious activity.

(2) Description of Related Art

MANETs are mobile wireless networks that use peer-to-peer communication and cooperation to relay data across the network, from source nodes to destination nodes. Due to the dynamic nature of the mobile wireless network topology, the protocols that govern how data is relayed across the network are built on a model of implicit trust and sharing of control information, which makes them particularly hard to defend against attacks on this control information. Although current network protocol stacks often provide security (e.g. encryption) for the data transmitted between pairs of nodes, the network control information must be visible to cooperating nodes which makes the network very difficult to secure (i.e., they cannot avoid "network insider" attacks). A compromised node can send bad information to subvert the operation of the network (e.g., by advertising itself as the fastest route to get to every other node in the network, but throwing away every packet it gets, which is called a blackhole attack). This kind of attack can often be executed without violating protocol so it is hard to detect with conventional techniques.

In an attempt to detect attacks on such networks, a variety of techniques have been employed. For example, signature defection is a technique that uses specific attack patterns known a-priori (this is ineffective against unknown attacks). Anomaly detection uses classifiers; however, effective classifiers are hard to construct due to network dynamics and they have low to moderate accuracy. Immunology is another technique that learns to identify behaviors that are foreign. A problem with immunology is that the approach is protocol specific, is hard to formulate, and has a high computational overhead. Another technique, referred to as extended finite state machine (FSM) models, detects explicit violations in protocol state transitions; however, the extended FSM approach is protocol and implementation specific.

Notably, no other approach uses graph-theoretic and information dynamics analysis to identify misbehaving nodes. In the area of information dynamics, a publication by Argollo de Menezes et al. shows the computation of a specific metric that is computed based on the values of signals at nodes in a network (see the List of Incorporated Literature References, Literature Reference No. 1). This metric is related to external and internal fluctuations of the signals but not to the machinery of mobile ad hoc networks (MANETs) nor to attack detection.

Current research in the detection of misbehaving nodes in mobile wireless networks is still predominantly focused on adapting and optimizing conventional network defense strategies that concentrate on behaviors at the lower layers of the networking stack. Research on strategies such as signature detection, statistical anomaly detection, and specification-based detection have proven effective for specific attack and network scenarios, but applicability to more general scenarios has proven elusive. The application of network science to cyber-security has only recently been recognized following breakthroughs of methods for modeling both logical and physical networks (see Literature Reference No. 2), where connectivity and dynamics are fundamentally different. The extension of this groundbreaking work to the challenging environment of mobile wireless networks, particularly under real-world assumptions of scale and complexity, has yet to be studied.

Thus, a continuing need exists for a system for detecting attacks on mobile ad hoc networks by identifying dynamic structure dependency changes in the network that signal suspicious activity.

SUMMARY OF INVENTION

This disclosure provides a system for detecting attacks on mobile networks. In some aspects, the system includes one or more processors and a memory, the memory being a non-transitory computer-readable medium having executable instructions encoded thereon. Upon execution of the instructions, the one or more processors perform several operations, including continuously measuring a time-varying signal at each node in a network; determining network flux on the time-varying signals of all nodes in the network; detecting a network attack if the network flux exceeds a predetermined threshold; and initiating a reactive protocol if the network flux exceeds the predetermined threshold.

In yet another aspect, in initiating the reactive protocol, the network is isolated from all external communications.

In another aspect, the time-varying signals are the traffic throughput amongst nodes in the network.

In yet another aspect, the time-varying signal is the number of instantaneous neighbors at each node. Note that the number of instantaneous neighbors is time varying in a MANET and, as such, the time-varying signal in this aspect is the number of instantaneous neighbors at each node.

In another aspect, the network flux is determined based on a function of internal fluctuations in the time-varying signals and external fluctuations in the time-varying signals.

Further, in determining network flux, the system performs operations of estimating internal fluctuations in the time-varying signals; estimating external fluctuations in the time-varying signals; evaluating for multiple nodes a ratio of the standard deviations of the external fluctuations and internal fluctuations across a time window, the ratio having a maximum; and determining the network flux based on the ratios for the multiple nodes. For example, the ratio has a maximum and the maximum of the ratio across the nodes is designated as the network flux; thus, in this example, the network flux is based on the ratios of the multiple nodes.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
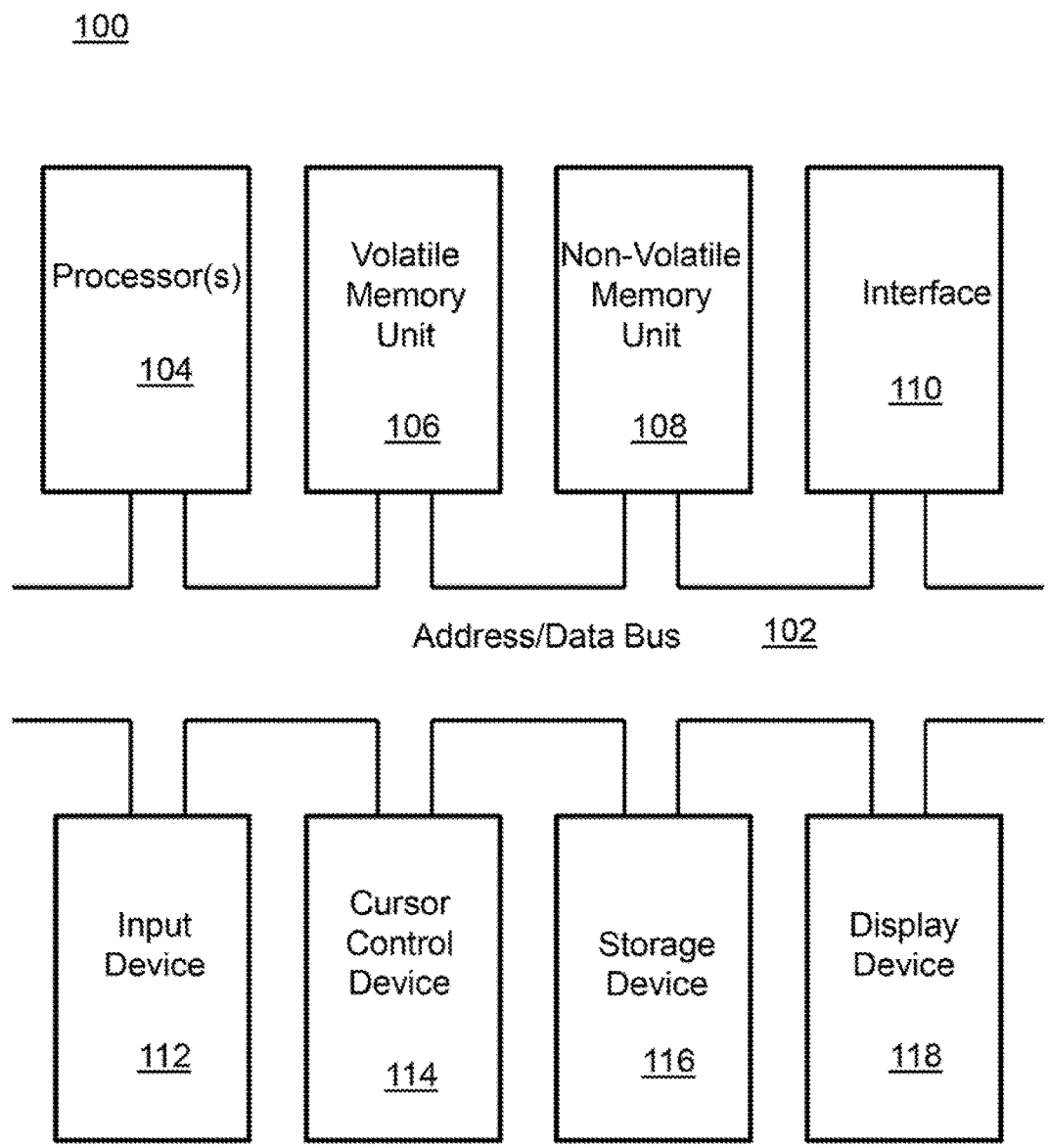
FIG. 1 is a block diagram depicting the components of a system according to various embodiments of the present invention.

The present invention is related to a system for detecting attacks on mobile ad hoc networks and, more specifically, to a system for detecting attacks by identifying dynamic structure dependency changes in the network that signal suspicious activity. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. M. Argollo de Menezes and A. L. Barabasi. Separating Internal and External Dynamics of Complex Systems, *Physical Review Letters* 93. pp. 068701, 2004.
2. M. Kurant and P. Thiran. Layered complex networks, *Physical Review Letters*, vol. 96, no. 13, pp. 138701, 2006.

(2) Principal Aspects

Various embodiments of the invention include three "principal" aspects. The first is a system for detecting attacks on mobile ad hoc networks. The system is typically in the form of a computer system operating software or in the form of a "hard-coded" instruction set. This system may be incorporated into and/or across a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such, as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
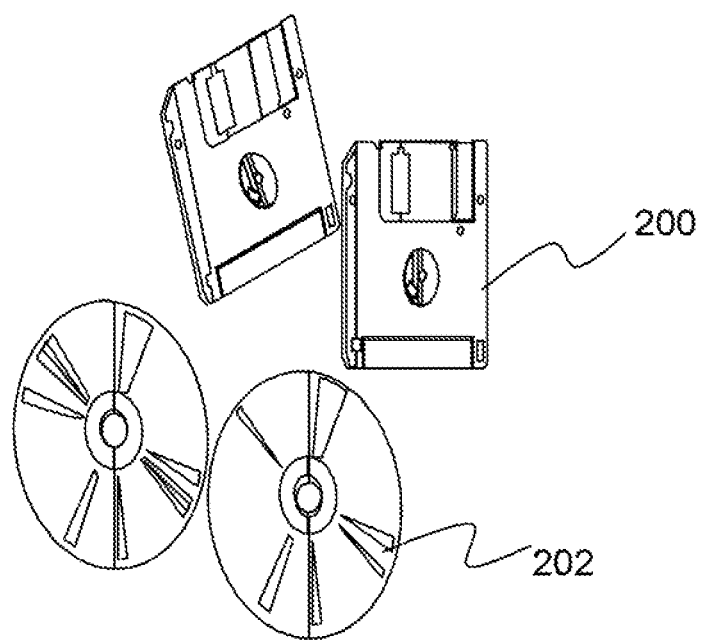
FIG. 2 is an illustration of a computer program product embodying and aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Due to the dynamic nature of mobile wireless network topology, these networks use protocols that are built on a model of implicit trust and sharing of control information, which makes them particularly hard to defend against attacks of misinformation. Current network protocol stacks secure the transmission between pairs of nodes. A compromised node can send bad information to subvert the operation of the network. Thus, this disclosure provides a system for detecting sources of misinformation in a holistic way, especially when multiple nodes are compromised. The system can identify dynamic structure dependency changes in the network that signal suspicious activity.

More specifically, this disclosure provides a system and method to detect attacks on mobile ad hoc networks (MANETs). The method continuously measures a signal at each node in the network. A non-limiting example of such a signal is the data throughput. Based on this signal and its fluctuation across nodes and time, a value is computed according to a specific formula as described in further detail below. If this value exceeds a threshold, the method signals detection of an attack. A unique aspect of the invention is to use the specific formula in the context of MANETs for attack detection.

Mobile wireless networks are experiencing widespread use in a variety of applications such as (1) mobile military and law enforcement networks (e.g., soldier-to-soldier, sensor-to-sensor, ground and aerial vehicle-to-vehicle); (2) commercial vehicle-to-vehicle and vehicle-to-infrastructure networks (e.g., DSRC V2V/V2I, WiFi, active safety, infotainment by the department of transportation (DOT)); (3) commercial mesh networks (e.g., metropolitan rooftop, WiMAX); and (4) wireless infrastructure internet service protocols (ISPs) and cellular companies (e.g., extended data capacity). The system described herein significantly improves the security of these and other related networks, which currently rely predominantly on packet-level encryption to reduce the probability of external intrusion but do not detect or prevent "network insider" attacks. Specific details of the system and method are provided in further detail below.

(4) Specific Details of Various Embodiments

Figure 3:
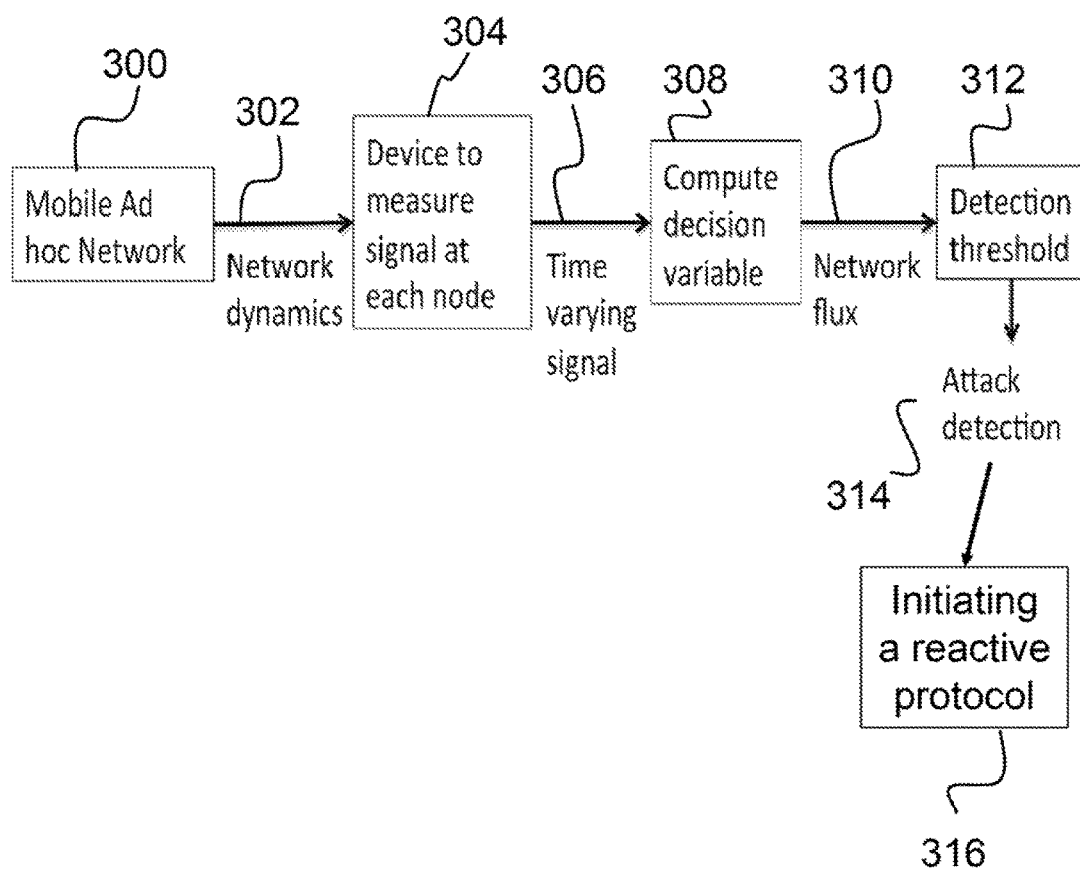
FIG. 3 is a flow chart depicting elements and process flow of the system according to various embodiments of the present invention.
Figure 4:
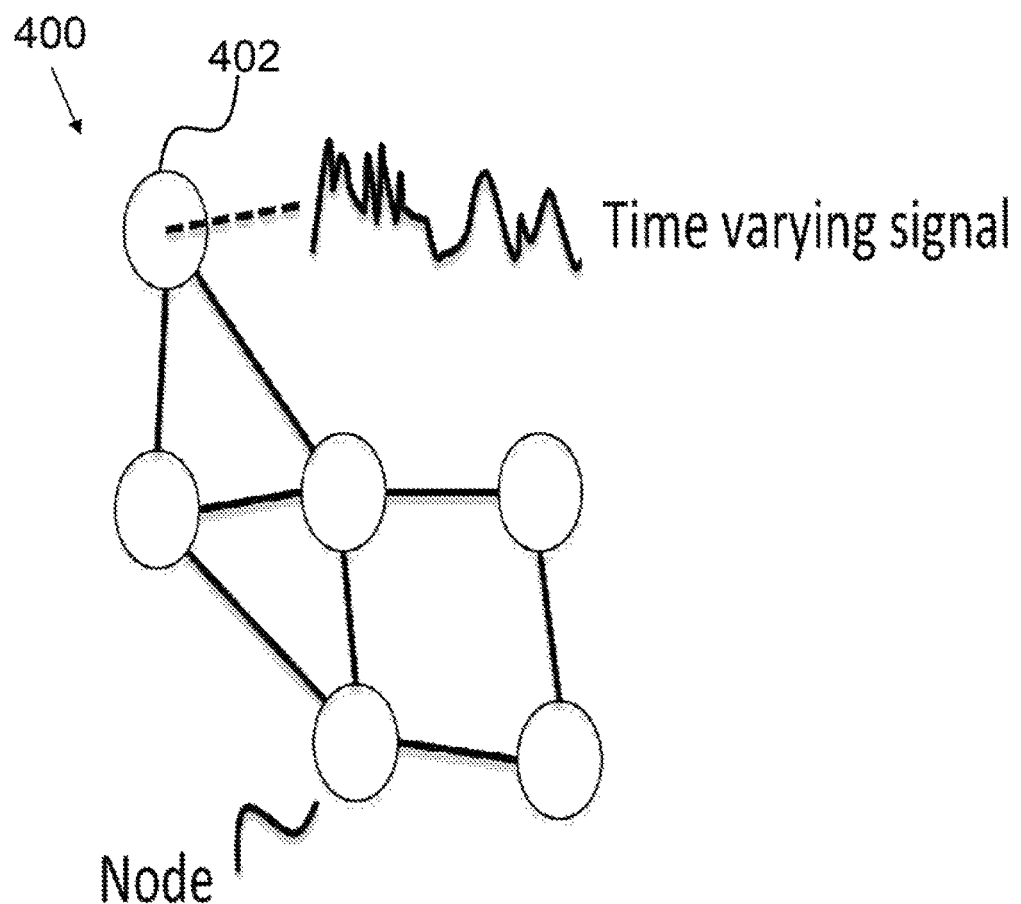
FIG. 4 is an illustration depicting a time-varying signal at a network node.

As noted above, this disclosure provides a system and method to detect attacks on mobile ad hoc networks (MANETs). As shown in process flow chart of FIG. 3, an attack on a mobile ad hoc network 300 changes the network dynamics 302. The network dynamics 302 are evaluated by the system based on using a device 304 to measure a time-varying signal 306 at each node of the network. An example of such a device 304 is a processor with software that counts the number of received bytes per second. Further, an example of such a network 400 and node 402 is depicted in FIG. 4. Referring again to FIG. 3, a decision variable (which is referred to as "network flux" 310) is then computed 308. If this value of network flux 310 exceeds a predetermined detection threshold 312, the system signals detection 314 of an attack. Once detected, the system can initiate 316 a number of reactive protocols. Non-limiting examples of such reactive protocols include alerting an administrator (e.g., via text, email, and/or automated phone messaging, etc.), ceasing all transmissions amongst nodes in the network, immediately isolating the network from all external communications (e.g., preventing the network from transmitting or receiving material outside of the network, such as electronically severing external links or using any other suitable technique for isolating a network), immediately isolating one or more nodes in the network, etc.

Network attacks can cause behavioral anomalies in the coupling of dynamical network features, such that the relationship of the features changes among nodes. The system analyzes for example the throughput or size of the local routing table to detect changes in the relationships between signals measured at each node. In a MANET, the routing table is dynamic and depends on the time-varying node locations.

In the following, a network composed of nodes with index i is assumed. At each node, a time varying signal $f_i$ can be measured. The method as described by Argollo de Menezes et al. in Literature Reference No. 1 can be used to estimate "external" versus "internal dynamics" in the measured signals. For example, "external" fluctuation of a node i is defined as $$f_i^{ext}(t) = A_i \sum_{i=1}^{N} f_i(t)$$

where $A_i$ is the time-averaged signal $f_i$ at node i. $A_i$ is the averaged signal over a time window of a specific length. The internal dynamics is the complement of the external such that both added together give the observed signal f, $f^{int}=f-f^{ext}$.

Figure 5:
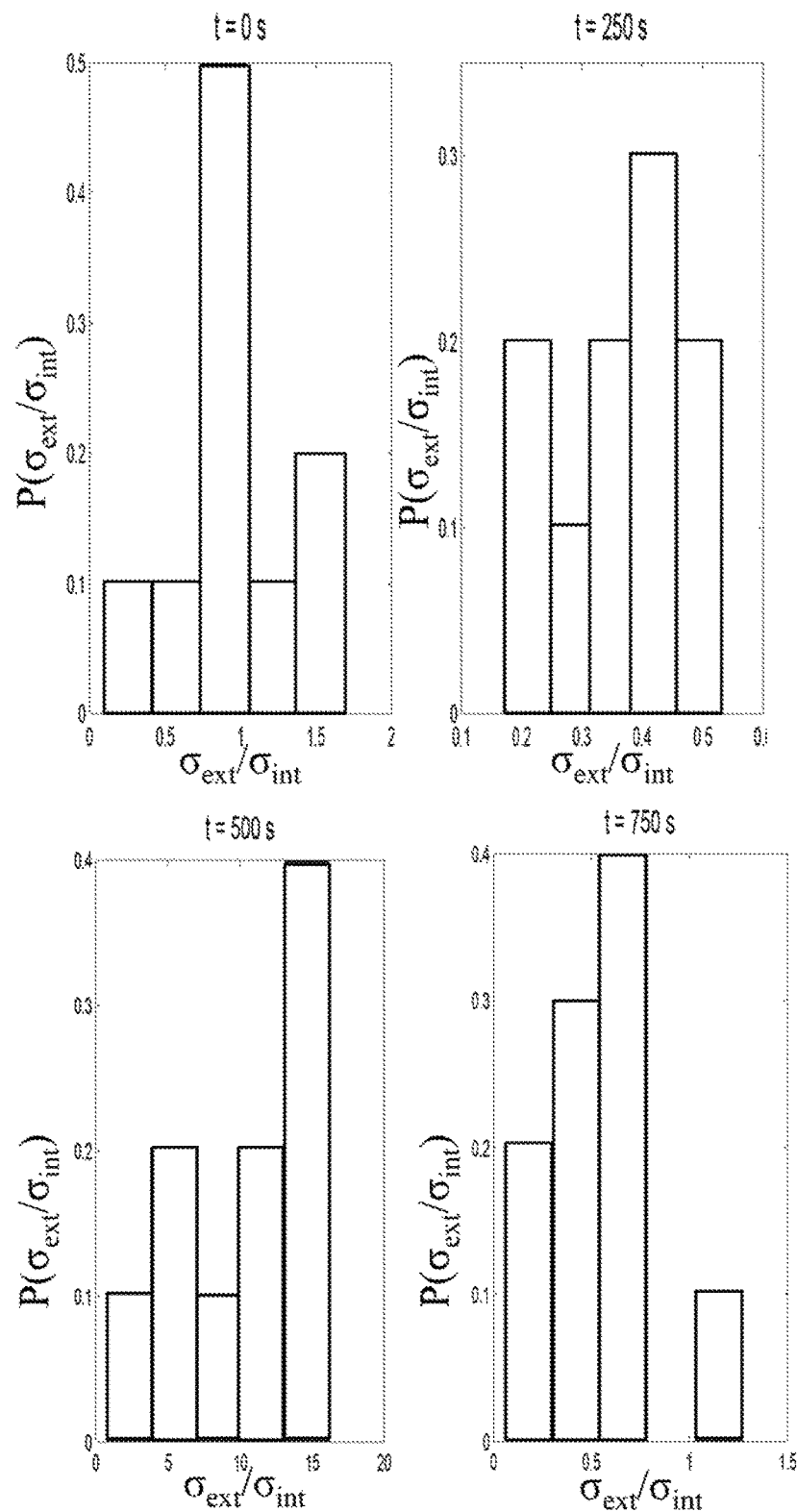
FIG. 5 is an illustration depicting a series of graphs to illustrate a distribution of "external" vs "internal" variance of data.

To compute a decision variable for detection, the system first evaluates for each node the ratio of the standard deviations of $f^{ext}$ and $f^{int}$ across the time window. FIG. 5 provides a series of bar graphs that show an example of the distribution of this ratio at different snapshots of network activity. Here, during a flooding attack, this ratio was about an order of magnitude larger than during baseline activity. As a decision variable for attack detection, the system uses the maximum of this ratio across nodes. This value is referred to as the network flux. If this value exceeds a predetermined threshold, then the system generates the attack alert and/or initiates the reactive protocol. As a non-limiting example, if the network flux exceeds 10 (compare with FIGS. 5 and 6B), then an attack is detected.

Figures 6A, 6B:
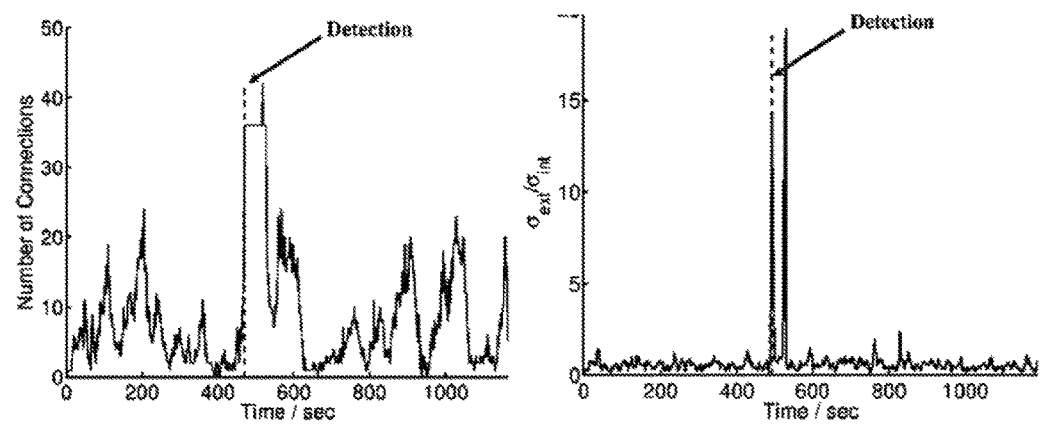
FIG. 6A is a graph depicting a number of virtual connections based on high temporal cross-correlation during a denial of service (DoS) attack.
FIG. 6B is a graph depicting network flux during a denial of service (DoS) attack.

The system was tested to demonstrate the ability to detect a denial-of-service attack using either the number of virtual connections based on high temporal cross-correlation or the network flux. The test data is a time-series of network throughput sampled at 2 second intervals (i.e., 2 s). Both algorithms use a running time window to process data. In FIGS. 6A and 6B, the window sizes were 20 s and 10 s, respectively. FIG. 6A is a graph depicting a number of virtual connections based on high, temporal cross-correlation during a DoS attack (occurring at t=500 s). FIG. 6B is a graph showing the network flux during a DoS attack (occurring at t=500 s).

For cross-correlation, the decision variable is the number of edges between nodes with a normalized correlation above a threshold of 0.85. With both methods, detection of a flooding attack was possible within 4 seconds of attack onset. However, the invention showed a much clearer detection signal (higher signal to noise) compared to the method with a correlation-based decision variable.

Figure 7A:
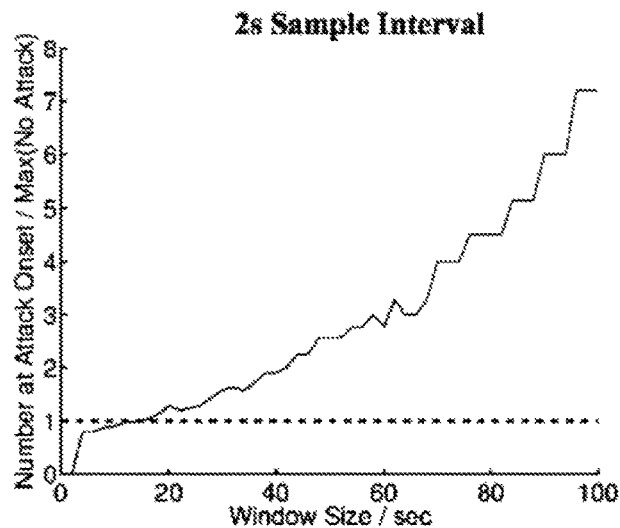
FIG. 7A is a chart depicting a decision variable for temporal cross-correlation (at a 2 second sample interval) depending on window size.
Figure 7B:
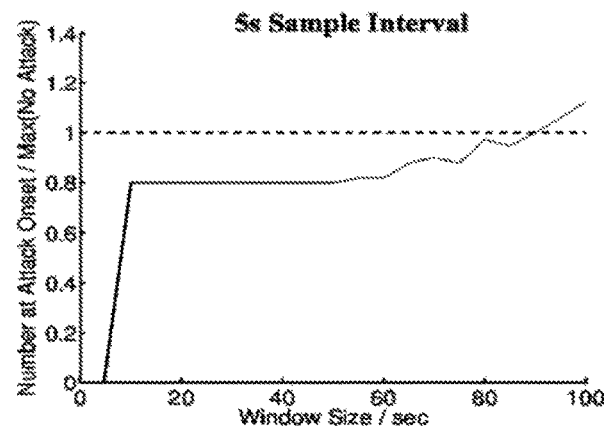
FIG. 7B is a chart depicting a decision variable for temporal cross-correlation (at a 5 second sample interval) depending on window size.
Figure 7C:
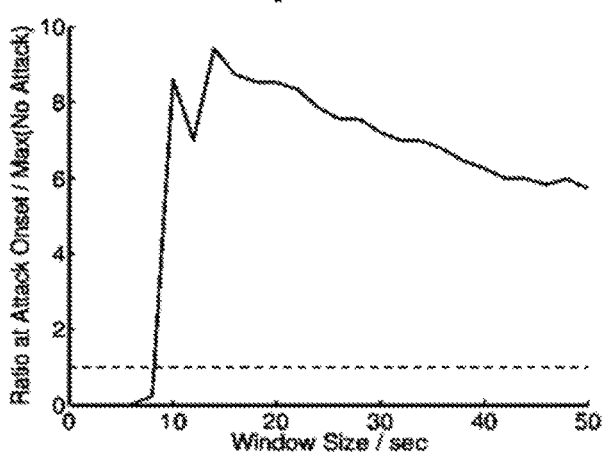
FIG. 7C is a chart depicting the network flux method as plotted against window size at a 2 second sample interval.

It should be noted that the impact of the data-window size impacts detection performance as shown in FIGS. 7A through 7C. Specifically, FIG. 7A is a chart depicting the decision variable for temporal cross-correlation (at a 2 second sample interval) depending on window size, while FIG. 7B depicts the same variables at a 5 second sample interval. FIG. 7C on the other hand is a chart depicting the network flux method as plotted against window size at a 2 second sample interval. The y-axes show the ratio of the detection variable at attack onset versus the maximum value of this variable without any attack. The graphs of FIGS. 7A and 7B are for the cross-correlation technique and FIG. 7C is for the network flux detection method. A value above 1 implies that perfect detection is possible without false positives (for this particular dataset). Here, flux analysis could work with smaller time windows compared to cross-correlation and thus enable a faster detection.

It was shown that network flux worked better than temporal cross-correlation for detecting a flooding attack. It was also found that the 2 s-sampled data were better than the 5 s-sampled data, and a 10 s time window was sufficient for perfect detection.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended w be read as means-plus-function elements, even if the claim otherwise includes the word "means". Further, while particular method steps have been recited in a particular order, the method steps may occur in any desired order and fall within the scope of the present invention.

What is claimed is:

1. A system for detecting attacks on mobile networks, the system comprising:
    one or more processors and a memory, the memory being a non-transitory computer-readable medium having executable instructions encoded thereon, such that upon execution of the instructions, the one or more processors perform operations of:
        continuously measuring a time-varying signal at each node in a network;
        determining network flux on the time-varying signals of all nodes in the network, the time-varying signal being a number of instantaneous neighbors at each node;
        detecting a network attack if the network flux exceeds a predetermined threshold; and
        initiating a reactive protocol if the network flux exceeds the predetermined threshold.

2. The system as set forth in claim 1, wherein the reactive protocol includes isolating the network from all external communications.

3. The system as set forth in claim 2, wherein the network flux is determined based on a function of internal fluctuations in the time-varying signals and external fluctuations in the time-varying signals.

4. The system as set forth in claim 3, wherein in determining network flux, the system performs operations of:
    estimating internal fluctuations in the time-varying signals;
    estimating external fluctuations in the time-varying signals;
    evaluating for multiple nodes a ratio of the standard deviations of the external fluctuations and internal fluctuations across a time window, the ratio having a maximum; and
    determining the network flux based on the ratios for the multiple nodes.

5. The system as set forth in claim 4, wherein the maximum of the ratio across the nodes is the network flux.

6. The system as set forth in claim 1, wherein the network flux is determined based on a function of internal fluctuations in the time-varying signals and external fluctuations in the time-varying signals.

7. The system as set forth in claim 1, wherein in determining network flux, the system performs operations of:
    estimating internal fluctuations in the time-varying signals;
    estimating external fluctuations in the time-varying signals;
    evaluating for each node a ratio of the standard deviations of the external fluctuations and internal fluctuations across a time window, the ratio having a maximum; and
    designating the maximum of the ratio across the nodes as the network flux.

8. The system as set forth in claim 7, wherein the maximum of the ratio across the nodes is the network flux.

9. A method for detecting attacks on mobile networks, the method comprising an act of:
    causing one or more processors to execute instructions encoded on a non-transitory computer-readable medium, such that upon execution, the one or more processors perform operations of:
        continuously measuring a time-varying signal at each node in a network;
        determining network flux on the time-varying signals of all nodes in the network, the time-varying signal being a number of instantaneous neighbors at each node;
        detecting a network attack if the network flux exceeds a predetermined threshold; and
        initiating a reactive protocol if the network flux exceeds the predetermined threshold.

10. The method as set forth in claim 9, wherein the reactive protocol includes isolating the network from all external communications.

11. The method as set forth in claim 10, wherein the network flux is determined based on a function of internal fluctuations in the time-varying signals and external fluctuations in the time-varying signals.

12. The method as set forth in claim 11, wherein in determining network flux, The method performs operations of:
    estimating internal fluctuations in the time-varying signals;
    estimating external fluctuations in the time-varying signals;
    evaluating for multiple nodes a ratio of the standard deviations of the external fluctuations and internal fluctuations across a time window, the ratio having a maximum; and
    determining the network flux based on the ratios for the multiple nodes.

13. The method as set forth in claim 9, wherein the network flux is determined based on a function of internal fluctuations in the time-varying signals and external fluctuations in the time-varying signals.

14. The method as set forth in claim 9, wherein in determining network flux, The method performs operations of:
    estimating internal fluctuations in the time-varying signals;
    estimating external fluctuations in the time-varying signals;
    evaluating for each node a ratio of the standard deviations of the external fluctuations and internal fluctuations across a time window, the ratio having a maximum; and
    designating the maximum of the ratio across the nodes as the network flux.

15. The method as set forth in claim 14, wherein the maximum of the ratio across the nodes is the network flux.

16. A computer program product for detecting attacks on mobile networks, the computer program product comprising:
a non-transitory computer-readable medium having executable instructions encoded thereon, such that upon execution of the instructions by one or more processors, the one or more processors perform operations of:
continuously measuring a time-varying signal at each node in a network;
determining network flux on the time-varying signals of all nodes in the network, the time-varying signal being a number of instantaneous neighbors at each node;
detecting a network attack if the network flux exceeds a predetermined threshold; and
initiating a reactive protocol if the network flux exceeds the predetermined threshold.

\* \* \* \* \*